US010024974B1

United States Patent
(12) United States Patent
Jau

(10) Patent No.: US 10,024,974 B1
(45) Date of Patent: Jul. 17, 2018

(54) METHOD AND APPARATUS APPLICABLE TO POSITIONING IN NLOS ENVIRONMENT

(71) Applicant: MEDIATEK INC., Hsin-Chu (TW)

(72) Inventor: Pei-Hung Jau, Tainan (TW)

(73) Assignee: MediaTek Inc., Hsin-Chu (TW)

( * ) Notice: Subject to any disclaimer, the term of this patent is extended or adjusted under 35 U.S.C. 154(b) by 279 days.

(21) Appl. No.: 14/863,433

(22) Filed: Sep. 23, 2015

Related U.S. Application Data

(60) Provisional application No. 62/067,997, filed on Oct. 24, 2014.

(51) Int. Cl.
*G01S 19/22* (2010.01)
*G01S 19/45* (2010.01)

(52) U.S. Cl.
CPC .............. *G01S 19/22* (2013.01); *G01S 19/45* (2013.01)

(58) Field of Classification Search
CPC ........ G01S 19/22; G01S 19/215; G01S 19/45; G01S 5/0215; G01S 5/0273
See application file for complete search history.

(56) References Cited

U.S. PATENT DOCUMENTS 5,974,329 A * 10/1999 Wylie .................. G01S 5/0215 342/457
6,434,396 B1 * 8/2002 Rune ..................... H04W 68/10 455/502

OTHER PUBLICATIONS

E.D. Kaplan et al., Understanding GPS: Principles and Applications, Second Edition, p. 54-58, 2006 (Year: 2006).*
B. Majhi et al., Robust Identification and Prediction using Wilcoxon Norm and Particle Swarm Optimization, 17th European Signal Processing Conference (EUSIPCO 2009), p. 1695-1699, Aug. 2009 (Year: 2009).*
H.-S. Wang et al., Sequential Quadratic Method for GPS NLOS Positioning in Urban Canyon Environments, International Journal of Automation and Smart Technology (auSMT), p. 37-46, 2013 (Year: 2013).*
A. Brown, "Multipath Rejection Through Spatial Processing," Sep. 2000.

* cited by examiner

*Primary Examiner* — Bernarr E Gregory
*Assistant Examiner* — Fred H Mull
(74) *Attorney, Agent, or Firm* — Wolf, Greenfield & Sacks, P.C.

(57) ABSTRACT

A method for determining a location of a target includes: obtaining a plurality of guess distance values of a plurality of satellites, respectively; utilizing satellite signals received from the plurality of satellites to estimate a plurality of pseudo range values of the plurality of satellites, respectively; comparing the guess range values with the pseudo range values to generate a residual vector; and utilizing a processing unit for applying a rank-based approach based on the residual vector to generate a calculation result. The location of the target is derived from the calculation result.

18 Claims, 6 Drawing Sheets

METHOD AND APPARATUS APPLICABLE TO POSITIONING IN NLOS ENVIRONMENT

CROSS REFERENCE TO RELATED APPLICATIONS

This application claims the benefit of U.S. provisional application No. 62/067,997, filed on Oct. 24, 2014 and incorporated herein by reference.

BACKGROUND

The present invention relates to satellite-based positioning of location of terminals, and more particularly, to a rank-based positioning method suitable for a non-line-of-sight (NLOS) environment.

Satellite-based navigation systems such as the Global Positioning System (GPS) and the Global Navigation Satellite System (GNSS) are utilized to provide accurate position information to users (e.g. vehicle drivers). These satellite-based navigation systems require at least three satellites to determine the location of a user. When GPS signals from three satellites are received, a "two-dimensional" position (latitude and longitude) of the terminal may be determined. Further, when GPS signals are received from four or more satellites, a "three-dimensional" position (latitude, longitude, and altitude) may be determined.

Signals received in the open are not easily affected by the surrounding environment. Hence, measurable pseudo ranges are only affected by common noise sources, such as receiver thermal noise, ionospheric delay, tropospheric delay, and satellite clock bias. These noise sources are well-known and can be corrected through a prediction model and/or other reference information. Signals received in urban areas, however, are not only affected by the above noise sources, but are also affected by signal reflections in the surrounding environment.

For instance, in a downtown area, there are many high buildings which provide large reflection surfaces to reflect or block GNSS/GPS signals. These reflection surfaces may cause the receiver to receive signals reflected from many directions or block the receiver from receiving desired signal, which may lower the positioning accuracy. Unfortunately, this issue is not easy to solve, because the reflected signals usually change with location and time. The above scenario is the well-known multipath effect, which may generate extra measurement errors in pseudo ranges.

The multipath effect is the major issue in conventional positioning methods such as the Newton-Raphson method. Conventional positioning methods cannot provide accurate positioning results when encountering the multipath effect. Specifically, iterations of an objective function for calculating the receiver position and the clock bias cannot converge to correct position. Conventional methods require the existence of line-of-sight (LOS) signals to correctly determine the position of the receiver.

Therefore, there is a need for a pure software solution for positioning in a multipath environment.

SUMMARY

An objective of the present invention is to provide a pure software solution for positioning with NLOS signals, wherein the pure software solution can be implemented in a positioning engine (PE). More specifically, the present invention is capable of reconstructing the information of corrupted satellites.

According to a first aspect of the present invention, a method for determining a location of a target is provided. The method includes: obtaining a plurality of guess distance values of a plurality of satellites, respectively; utilizing satellite signals received from the plurality of satellites to estimate a plurality of pseudo range values of the plurality of satellites, respectively; comparing the guess distance values with the pseudo range values to generate a residual vector; and utilizing a processing unit for applying a rank-based approach based on the residual vector to generate a calculation result. The location of the target is derived from the calculation result.

According to a second aspect of the present invention, an apparatus for determining a location of a target is provided. The apparatus includes an estimation unit and a processing unit. The estimation unit is arranged to obtain a plurality of guess distance values of a plurality of satellites, respectively, and utilize satellite signals received from the plurality of satellites to estimate a plurality of pseudo range values of the plurality of satellites, respectively. The processing unit is arranged to compare the guess range values with the pseudo range values to generate a residual vector, and apply a rank-based approach based on the residual vector to generate a calculation result; wherein the location of the target is derived from the calculation result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

The present invention may be applied to GNSS/GPS positioning systems. Further, the present invention may be based on a triangulation positioning method, such as the time-of-arrival (TOA) method. The TOA information can be determined by comparing the local time and the satellite time embedded in the GNSS/GPS radio signals. After determining the TOA information, the distances between the user/receiver and the satellites can be easily obtained by multiplying the TOAs by the speed of light ($3*10^8$ m/sec). Please note that the GNSS/GPS systems are merely mentioned for illustrative purposes, and not meant limit the present invention, which may be applied to other positioning systems.

Figure 1:
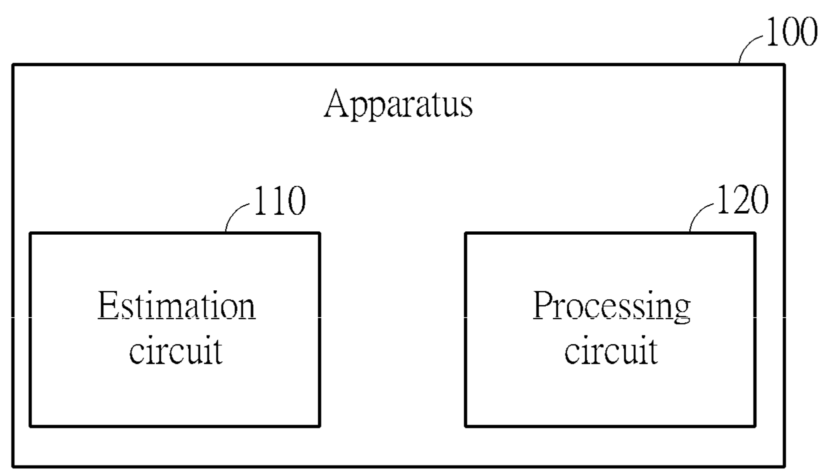
FIG. 1 is a diagram illustrating an apparatus for determining a location of a target according to an embodiment of the present invention.

FIG. 1 is a diagram illustrating an apparatus 100 for determining a location of a target (e.g. a vehicle) according to an embodiment of the present invention. The apparatus 100 includes an estimation unit 110 and a processing unit 120. The estimation unit 110 is arranged to obtain a plurality of guess range values $\rho_0^{(k)}$ of a plurality of satellites, respectively, and utilize satellite signals received from the plurality of satellites to estimate a plurality of pseudo range values $\rho_0^{(k)}$ of the plurality of satellites, respectively, where $\rho_0^{(k)}$ denotes a guess range value of a k-th satellite, and k is a positive integer.

Figure 2:
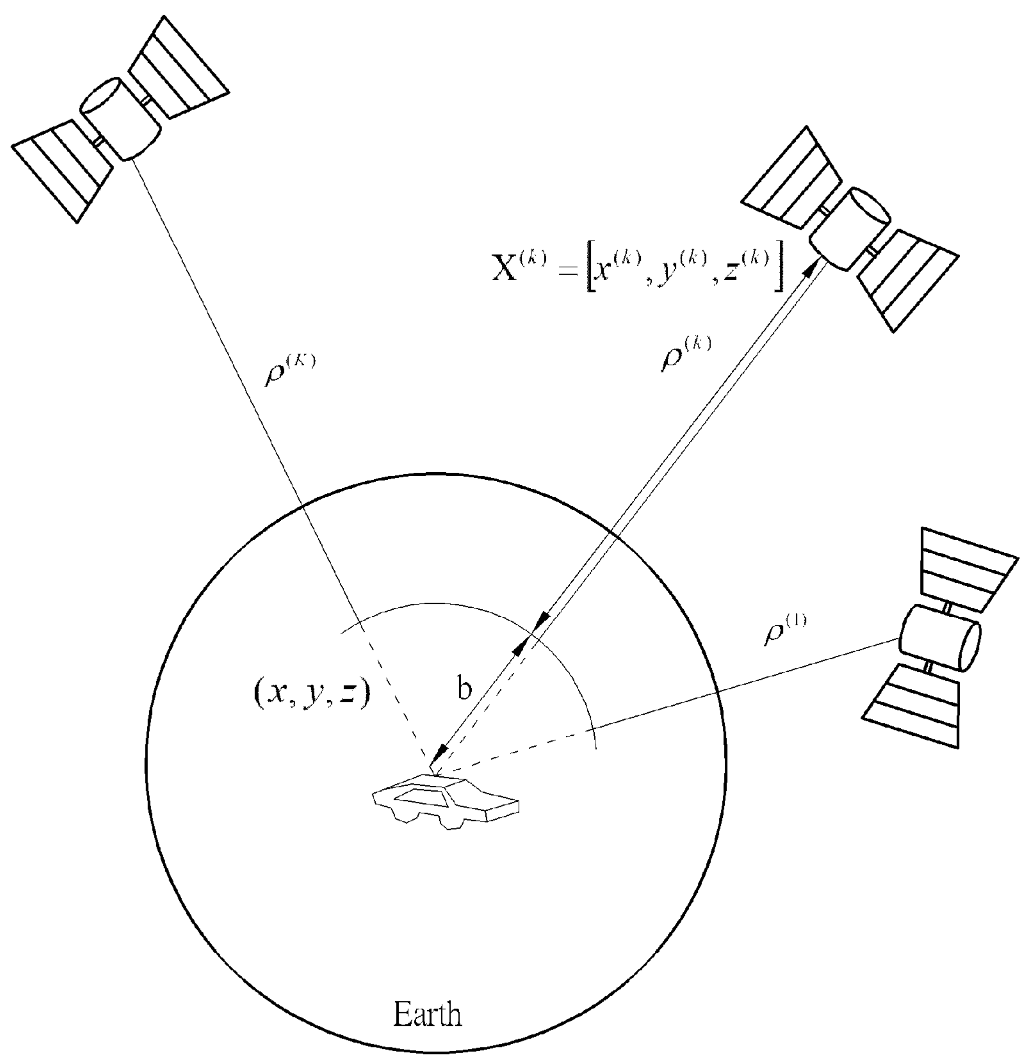
FIG. 2 is a diagram illustrating a scenario of measuring distances between satellites and a target.

FIG. 2 is a diagram illustrating a scenario of measuring distances between satellites and a target (e.g. a vehicle) 150. The guess range values of the plurality of satellites may be set by an Equation 1.1:

$$\rho_0^{(k)}=\|X^{(k)}-X_0\|_2+b_0 \tag{1.1}$$

In Equation 1.1, $X^{(k)}$ denotes a position of the k-th satellite, $X_0$ denotes an initial guess position, and $b_0$ denotes a guess clock bias. The position of the target may be represented as $X=X_0+\delta X$, and a clock bias is represented as $b=b_0+\delta b$, where X denotes the position of the target, $\delta X$ denotes the difference between the position of the target and the guess position, and $\delta b$ denotes the difference between the clock bias and the guess clock bias. The pseudo range values of the plurality of satellites may be represented as Equation 1.2 which shows the relationship between pseudo-ranges, receiver clock biases and positions of visible satellites.

$$\rho^{(k)}=\|X^{(k)}-X_0\|_2+b+\tilde{\varepsilon}_\rho^{(k)} \tag{1.2}$$

In Equation 1.2, $\rho^{(k)}$ denotes a pseudo range value of the k-th satellite, $\tilde{\varepsilon}_\rho^{(k)}$ is a parameter denoting a combined effect of the range errors, and b is the bias in meters caused by the clock bias between the receiver local time and the GNSS/GPS time. In an LOS environment, the parameter $\tilde{\varepsilon}_\rho^{(k)}$ is only composed of the ionospheric delay, the tropospheric delay, satellite clock bias modeling error, orbit prediction error and receiver thermal noise. In a multipath/non-line-of-sight (NLOS) environment, however, the parameter $\tilde{\varepsilon}_\rho^{(k)}$ may actually include multipath components.

Note that the three dimensional position of a k-th satellite can be expressed as $X^{(k)}=[x^{(k)}, y^{(k)}, z^{(k)}]$. In Equation 1.2, $X^{(k)}$ and $\rho^{(k)}$ are known parameters, while X and b representing the positions of user and the receiver clock bias, respectively, are unknown parameters.

The processing unit 120 is arranged to compare the initial guess distance values ($\rho_0^{(k)}$) with the pseudo range values ($\rho^{(k)}$) respectively to generate a residual vector ($\delta\rho^{(k)}=\rho^{(k)}-\rho_0^{(k)}$), and apply a rank-based approach based on the residual vector to generate a calculation result, wherein the location of the target is derived from the calculation result. Specifically, the residual vector $\delta\rho^{(k)}$ may be obtained by processing a norm equation of the residual vector $\delta\rho^{(k)}$. An example is shown as follows.

A set of K linearized equations can be expressed in a matrix notation as shown in Equation 1.3, and the residual vector $\delta\rho$ can be derived from Equation 1.3, and is shown in Equation 1.4.

$$\delta\rho = \begin{bmatrix} \delta\rho^{(1)} \\ \delta\rho^{(2)} \\ \vdots \\ \delta\rho^{(k)} \end{bmatrix} = \begin{bmatrix} (-1^{(1)})^T & 1 \\ (-1^{(2)})^T & 1 \\ \vdots & \\ (-1^{(k)})^T & 1 \end{bmatrix} \begin{bmatrix} \delta X \\ \delta b \end{bmatrix} + \tilde{\varepsilon}_\rho \tag{1.3}$$

$$\delta\rho = G\begin{bmatrix} \delta X \\ \delta b \end{bmatrix} + \tilde{\varepsilon}_\rho \tag{1.4}$$

In Equation 1.4, G is a (k×4) matrix representing the user-satellite geometry, and can also be called a geometry matrix. The solutions of the above Equation for k≥4 are shown in Equations 1.5 and 1.6:

$$\begin{bmatrix} \delta\hat{X} \\ \delta\hat{b} \end{bmatrix} = (G^T G)^{-1} G^T \delta\rho \tag{1.5}$$

$$\hat{X} = X_0 + \delta\hat{X},\ \hat{b} = b_0 + \delta\hat{b} \tag{1.6}$$

The solutions $\hat{X}$ and $\hat{b}$ may be repeatedly used to perform iterations on the initial guesses of the user position $X_0$ and the receiver clock bias $b_0$, as shown in Equation 1.6. In other words, the values of $\hat{X}$ and $\hat{b}$ may be updated after each time iteration.

The whole process of the Newton-Raphson method can be considered as the process of minimizing the 2-norm of the residual vector $\delta\rho$, and is shown in Equation 1.7. This is also similar to solving a nonlinear regression problem with a least square objective function.

$$\min_{X,b}\Psi_2(X, b) = \|\delta\rho\|_2 \tag{1.7}$$

The objective function shown in Equation 1.7 will be processed with robust estimation proposed by the present invention. Specifically, a rank-based norm $\|\bullet\|_R$ is utilized as a new objective function for Equation 1.7, as shown in Equation 1.8. The rank-based norm is defined in Equation 1.9. Note that this new objective function does not change with the variations of the receiver clock bias.

$$\min_{X,b}\Psi_R(X, b) = \|\delta\rho\|_R \tag{1.8}$$

$$\|v\|_R = \sum_{i=1}^{l} a(\Re(v_i))v_i, \text{ for } v = [v_1, v_2, \ldots v_l]^T \in \Re^l \tag{1.9}$$

Regarding the rank-based norm $\|v\|_R$ in Equation 1.9, the residual vector v represents $\delta\rho$, $\Re(v_i)$ denotes a rank of $v_i$ within $v_1, \ldots, v_l$ denotes a rank of a magnitude of an i-th measured distance, and $a(\Re(v_i))$ denotes a score of the i-th measured distance. The positioning accuracy can be improved by assigning different scores to the measured distances. For example, the influence of measured distances having relative large measurement outliers can be reduced by the assigned weighting $a(\Re(v_i))$, where the measured distance having a larger measurement outlier will be fixed with a larger punishment provided by the score $a(\mathfrak{R}(v_i))$.

By using the numerical method such as the gradient decent method, the rank-based norm shown in Equation 1.9 can be minimized with the solution, $\hat{X}$ and $\hat{b}$, which can be considered as the true position of the user.

For a better understanding of the operations of the rank-based norm $\|\bullet\|_R$, a numerical example of a vector $v\in\mathfrak{R}^3$ is illustrated in the following Equations 2.1-2.5. Please note this is merely for illustrative purposes, and not meant to limit the present invention. The vector v and the sorted vector $v_s$ are given in the following Equation 2.1, and the weighting vector can be derived from Equation 2.2.

$$v=\begin{bmatrix}v_1\\v_2\\v_3\end{bmatrix}=\begin{bmatrix}6\\5\\2\end{bmatrix}\overset{\text{sorting}}{=>}v_s=\begin{bmatrix}v_{(1)}\\v_{(2)}\\v_{(3)}\end{bmatrix}=\begin{bmatrix}2\\5\\6\end{bmatrix}\text{ and }R_v=\begin{bmatrix}3\\2\\1\end{bmatrix}\tag{2.1}$$

$$a(R(v))=\varphi\left[\frac{R(v)}{l+1}\right],\ l=3\tag{2.2}$$

$$\Rightarrow a(R(v))=\begin{bmatrix}\varphi(3/4)\\\varphi(2/4)\\\varphi(1/4)\end{bmatrix}=\sqrt{12}\begin{bmatrix}1/4\\0\\-1/4\end{bmatrix},$$

$$\text{where }\varphi(u)=\sqrt{12}\,(u-0.5)$$

The property of the rank-based approach in a linear model is illustrated above, which defines a rank-based objective function. Please note that the equation $\varphi(u)=\sqrt{12}(u-0.5)$ can be obtained from the Wilcoxon norm, and is merely an example of the rank-based approach rather than a limitation of the present invention. Since one skilled in the art will be familiar with the Wilcoxon norm, a detailed description is omitted for brevity.

The following sections will introduce how to apply the rank-based approach to GNSS/GPS positioning.

After the solutions $\hat{X}$ and $\hat{b}$ of the objective function shown in Equation 1.9 are obtained, the true position of the target (i.e. $\hat{X}$ and $\hat{b}$) can be determined by using the gradient decent method.

Note that the operation represented by Equation 1.6 can be performed repeatedly. For example, a numerical method such as a gradient decent method may be applied to minimize the objective function. The increased number of iterations may improve the positioning accuracy of the position of the target (e.g. $\hat{X}$ and $\hat{b}$). The values of $\hat{X}$ and $\hat{b}$ obtained from performing the objective function shown in Equation 1.9 for the first time may be used as new initial guess values for performing the objective function shown in Equation 1.9 for the second time. For example, as shown in Equation 2.3, $X_1$ is the position value determined from the first time iteration, and $b_1$ is the clock bias value determined from the first time iteration.

$$\hat{X}=X_1+\delta\hat{X},\ \hat{b}=b_1+\delta\hat{b}\tag{2.3}$$

In light of the above, the implementations of the apparatus 100 may assist in finding a correct target position, wherein the calculation for $\delta\hat{X}$ and $\delta\hat{b}$ converges perfectly during iterations regardless of the multipath effect. Hence, the errors caused from multipath, satellite corruption and/or measurement bias can be fixed by utilizing the rank-based norm approach of the present invention, whereas conventional solutions using a triangulation positioning method (e.g. the Newton-Raphson method) cannot minimize the errors under the existence multipath. Hence, the present invention may effectively solve the multipath issue.

Based on the concept and spirit of the present invention mentioned above, some positioning schemes are provided as follows.

Figure 3:
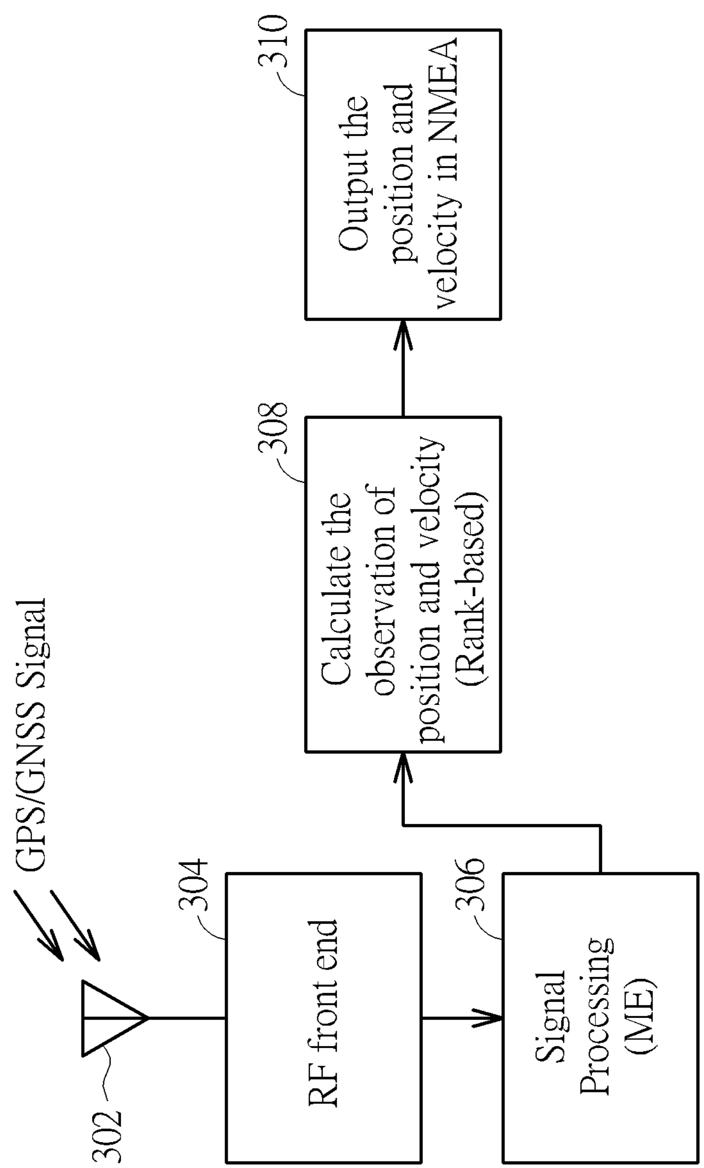
FIG. 3 is a diagram illustrating a positioning scheme according to a first embodiment of the present invention.

FIG. 3 is a diagram illustrating a positioning scheme 300 according to a first embodiment of the present invention. As shown in FIG. 3, the positioning scheme 300 includes an antenna module 302 and Blocks 304-310, wherein the Block 302 represents a radio frequency (RF) front end, Block 306 represents a signal processing procedure, Block 308 represents calculating the observation of position and velocity with the proposed rank-based approach, and Block 310 represents outputting the position and velocity in a GPS/GNSS standard format. The GPS/GNSS standard format mentioned in Block 310 may be the National Marine Electronics Association (NMEA). In this embodiment, the calculation result generated in Block 308 may be directly used to obtain the position and velocity of the target. Note that the calculation result generated in Block 308 may eliminate the error components derived from the clock bias, satellite corruption and/or measurement bias (e.g. the bias caused by the multipath effect).

Figure 4:
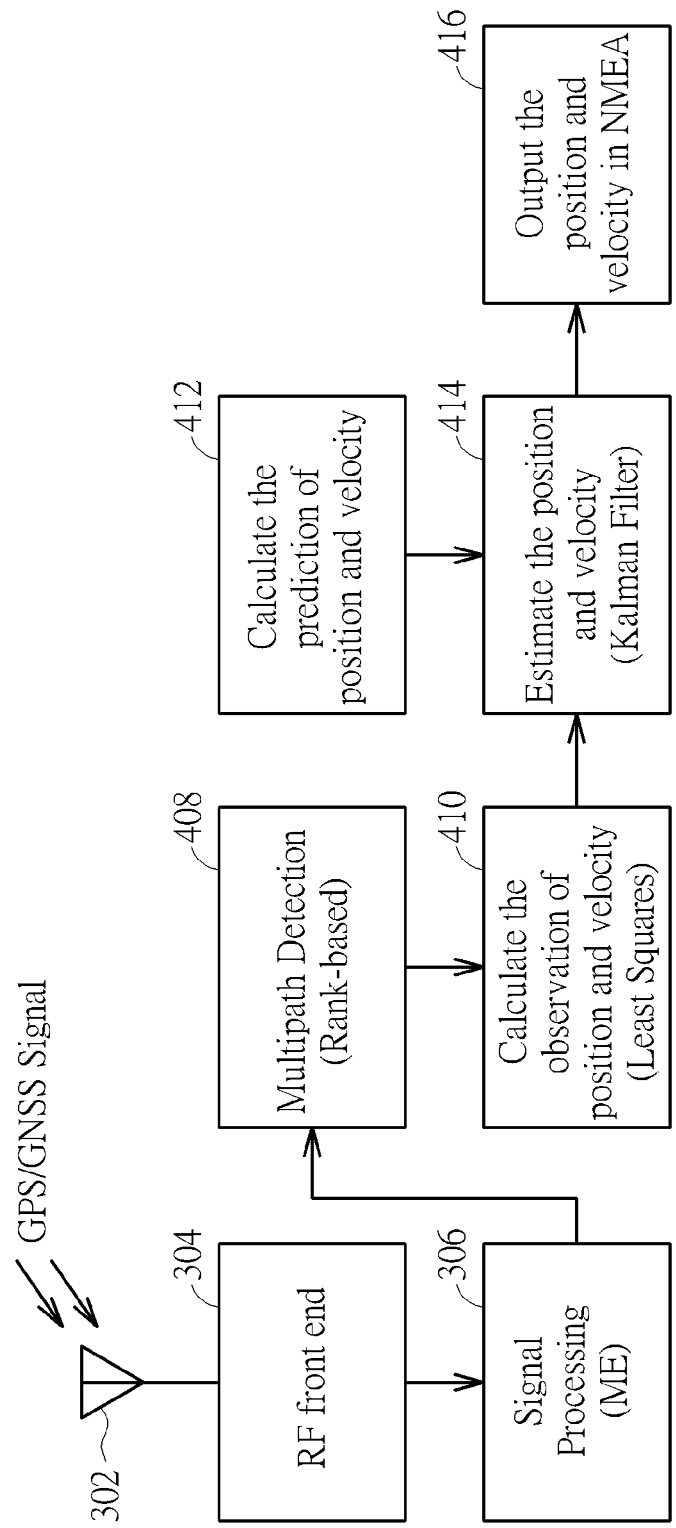
FIG. 4 is a diagram illustrating a positioning scheme according to a second embodiment of the present invention.

FIG. 4 is a diagram illustrating a positioning scheme 400 according to a second embodiment of the present invention. The positioning scheme 400 includes an antenna module 302 and Blocks 304, 306, 408-416 and 316, wherein Block 408 represents the multipath detection based on the proposed rank-based approach, Block 410 represents calculation for the observation of position and velocity based on a conventional algorithm (e.g. a least square algorithm), Block 412 represents calculating the prediction of position and velocity, and Block 414 represents estimating the position and velocity with a filter (e.g. a Kalman filter). In related arts, receiver autonomous integrity monitoring (RAIM) is commonly implemented to ease the multipath effect but this is not desirable. In this embodiment, the processing unit 120 is further utilized to derive an error effect component from the calculation result (Block 408). After receiving the error effect component transmitted from Block 408, Block 410 may calculate the position of the target based on the error effect component, the residual vector, and a non-rank-based approach, wherein the error effect component includes at least the multipath effect component. Note that the aforementioned non-rank-based approach can be any conventional algorithm other than the proposed rank-based approach, such as a least square approach. That is, the rank-based approach of the present invention may also combine or assist the conventional approach to achieve a better positioning accuracy. Block 408 may be utilized to deliver the error component to follow-up circuitry (e.g. Blocks 410 and 414) as a calculation reference. Further, in Block 414, a suitable filter (e.g. a Kalman filter) may also be utilized to improve the positioning accuracy.

Figure 5:
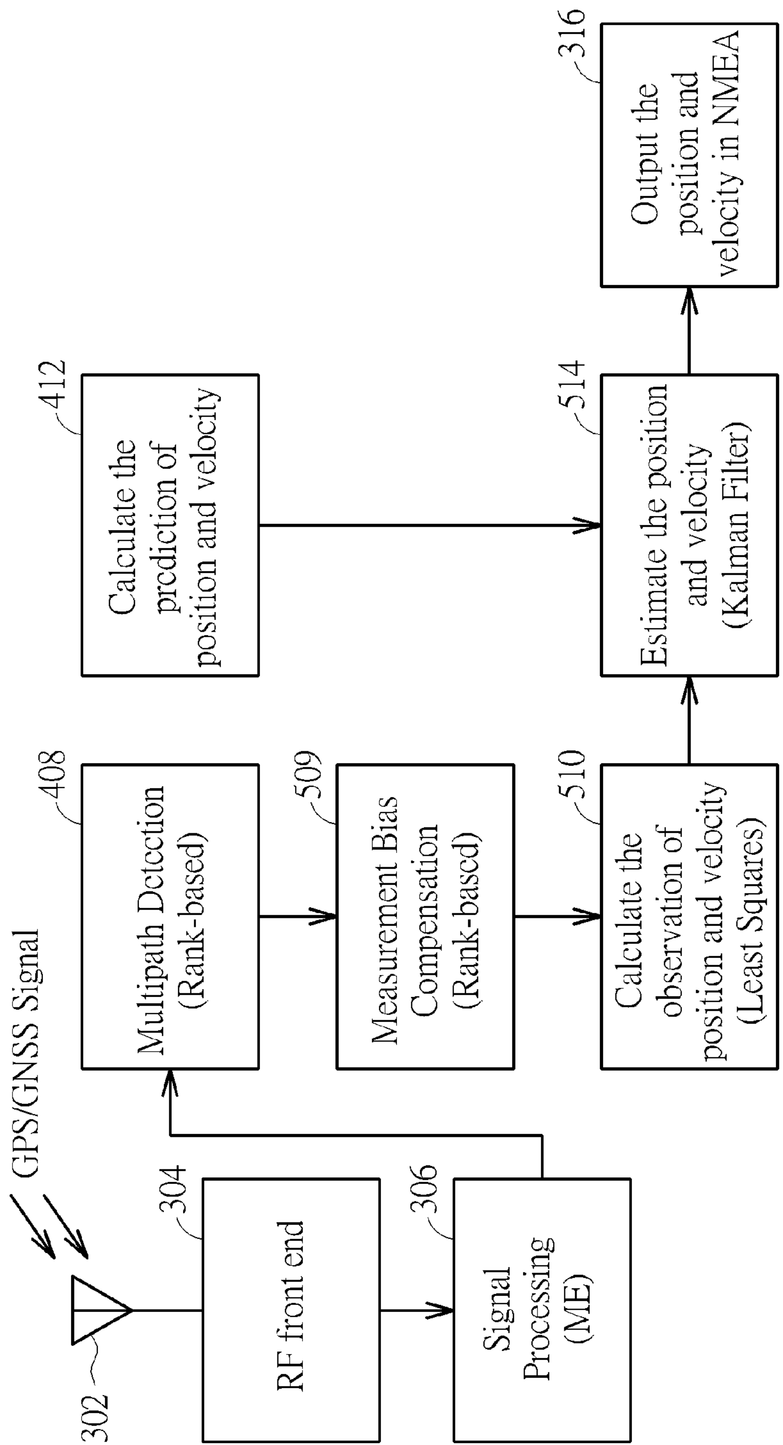
FIG. 5 is a diagram illustrating a positioning scheme according to a third embodiment of the present invention.

FIG. 5 is a diagram illustrating a positioning scheme 500 according to a third embodiment of the present invention. The difference between FIGS. 4 and 5 is that the positioning scheme 500 further includes Block 509 for compensating the measurement bias received from Block 408, wherein the measurement bias may be obtained by utilizing the proposed rank-based approach. Since the measurement bias is compensated in Block 509, Blocks 510 and 514 may directly utilize the compensated result without further performing a compensating operation.

In this embodiment, the processing unit 120 of the apparatus 100 may derive an error effect component from a calculation result, generate a compensated residual vector by compensating the residual vector based on the error effect component and the residual vector, and calculate the position of the target based on the compensated residual vector, wherein the error effect component includes at least the multipath effect component.

Figure 6:
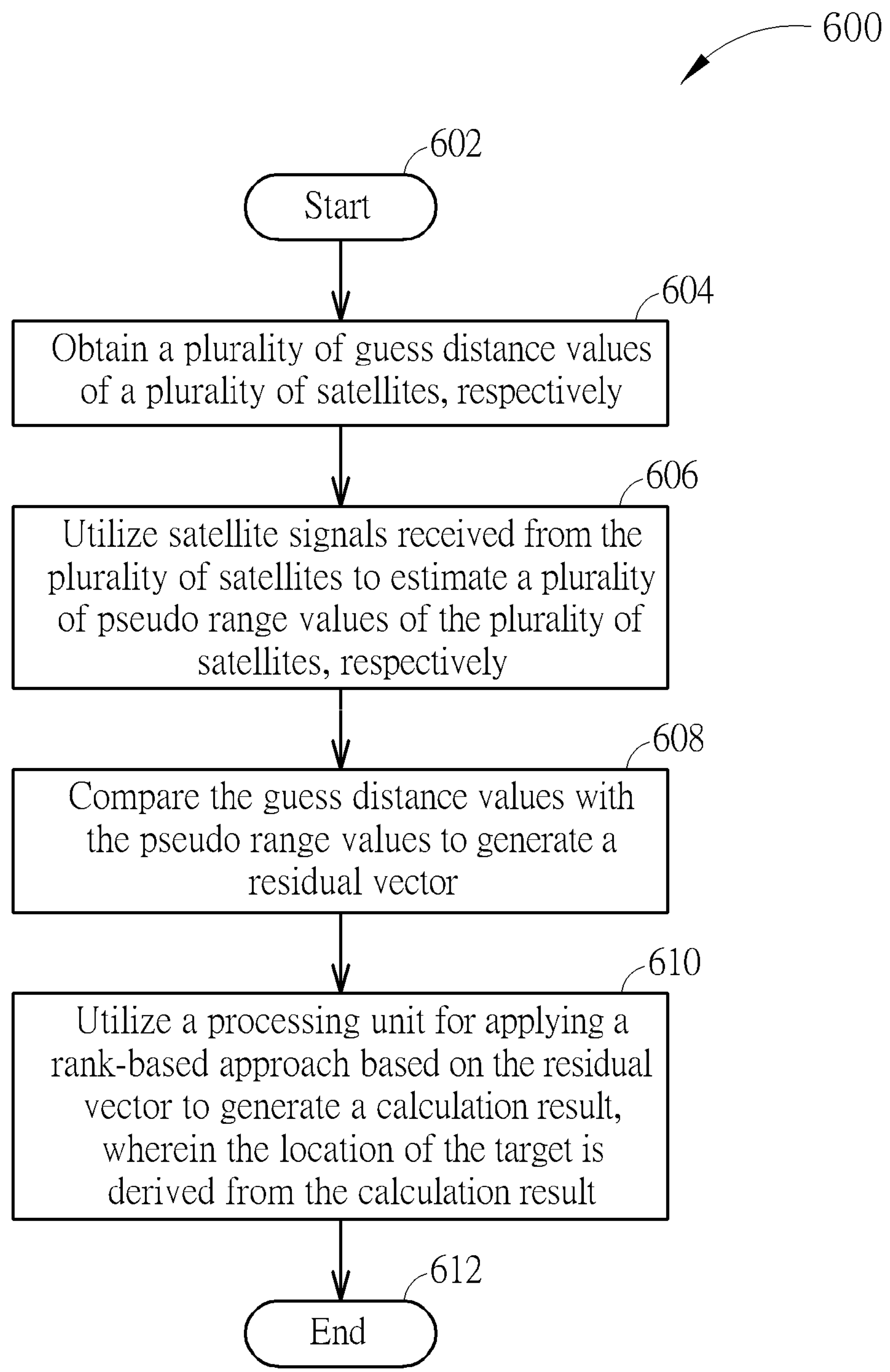
FIG. 6 is a flowchart illustrating a method for determining a location of a target according to an embodiment of the present invention.

FIG. 6 is a flowchart illustrating a method 600 for determining a location of a target according to an embodiment of the present invention. If the result is substantially the same, the steps are not required to be executed in the exact order shown in FIG. 6. The method 600 shown in FIG. 6 may be employed by the apparatus 100, and can be briefly summarized as follows.

Step 602: Start;

Step 604: Obtain a plurality of guess distance values of a plurality of satellites, respectively.

Step 606: Utilize satellite signals received from the plurality of satellites to estimate a plurality of pseudo range values of the plurality of satellites, respectively.

Step 608: Compare the guess distance values with the pseudo range values to generate a residual vector.

Step 610: Utilize a processing unit for applying a rank-based approach based on the residual vector to generate a calculation result, wherein the location of the target is derived from the calculation result.

Step 612: End.

The method 600 illustrates operations of the apparatus 100. As one skilled in the art can understand the details after reading the paragraphs directed to apparatus 100, further description is omitted here for brevity.

To summarize, the present invention provides a pure software solution which can be implemented in the positioning engine (PE), can avoid modification of the design of the antenna, is capable of dealing with non-line-of-sight (NLOS) signals, and is applicable in static positioning, and reconstructing corrupted satellite information. In the present invention, a new positioning method based on the robust estimation is proposed to reduce/eliminate the multipath effect in positioning systems (e.g., GPS/GNSS). While the positioning result of the traditional approach (e.g. the least squares approach) is sensitive to the pseudo-range measurement outliers caused by NLOS signals, the proposed rank-based approach has better performance against larger outliers and also provides better robustness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a positioning system comprising an estimation circuit and a processing unit to determine a location of a target, comprising:

obtaining, by the estimation circuit, a plurality of guess distance values of a plurality of satellites, respectively;

utilizing, by the estimation circuit, satellite signals received from the plurality of satellites to estimate a plurality of pseudo range values of the plurality of satellites, respectively;

comparing, by the processing unit, the guess distance values with the pseudo range values respectively, to generate a residual vector;

applying, by the processing unit, a rank-based approach based on the residual vector to generate a calculation result;

deriving, by the processing unit, an error effect component from the calculation result;

generating, by the processing unit, a compensated residual vector by compensating the residual vector based on the error effect component and the residual vector;

calculating, by the processing unit, the position of the target based on the compensated residual vector; and outputting, by the processing unit, the calculated position of the target.

2. The method of claim 1, wherein the guess distance values of the plurality of satellites are set by an equation $\rho_0^{(k)}=\|X^{(k)}-X_0\|_2+b_0$, where $\rho_0^{(k)}$ denotes a guess distance value of a k-th satellite, $X^{(k)}$ denotes a position of the k-th satellite, $X_0$ denotes a guess position, $b_0$ denotes a guess clock bias, and K is a positive integer.

3. The method of claim 2, wherein the position of the target is calculated at least in part based on a relationship between the position of the target, the guess position, and a difference between the position of the target and the guess position.

4. The method of claim 2, wherein the pseudo range values of the plurality of satellites are represented as $\rho^{(k)}=\|X^{(k)}-X\|_2+b+\tilde{\varepsilon}_\rho^{(k)}$, where $\rho^{(k)}$ denotes a pseudo range value of the k-th satellite, and $\tilde{\varepsilon}_\rho^{(k)}$ is a range error parameter.

5. The method of claim 4, wherein the range error parameter $\tilde{\varepsilon}_\rho^{(k)}$ is at least caused by a multipath effect.

6. The method of claim 2, wherein the rank-based approach comprises a rank-based objective function represented as $$\|v\|_R=\sum_{i=1}^{l} a(\mathfrak{R}(v_i))v_i,$$

where $\|v\|_R$ denotes a rank-based norm with a residual vector v representing $\delta\rho$, $\mathfrak{R}(v_i)$ denotes a rank of $v_i$ among $v_1, \ldots, v_l$, $v_i$ denotes a rank of a magnitude of an i-th measured distance, and $a(\mathfrak{R}(v_i))$ denotes a score of the i-th measured distance.

7. The method of claim 1, wherein calculating the position of the target comprises calculating the position of the target based on a non-rank-based approach.

8. The method of claim 7, wherein the error effect component comprises a multipath effect component.

9. The method of claim 1, wherein the error effect component comprises a multipath effect component.

10. A positioning system for determining a location of a target, comprising:

an estimation circuit, arranged to:

obtain a plurality of guess distance values of a plurality of satellites, respectively, and utilize satellite signals received from the plurality of satellites to estimate a plurality of pseudo range values of the plurality of satellites, respectively; and a processing unit, arranged to:

compare the guess range values with the pseudo range values respectively, to generate a residual vector, apply a rank-based approach based on the residual vector to generate a calculation result, derive an error effect component from the calculation result, generate a compensated residual vector by compensating the residual vector based on the error effect component and the residual vector, calculate the position of the target based on the compensated residual vector, and output the calculated position of the target.

11. The positioning system of claim 10, wherein the guess distance values of the plurality of satellites are set by an equation $\rho_0^{(k)}=\|X^{(k)}-X_0\|_2+b_0$, where $\rho_0^{(k)}$ denotes a guess range value of a k-th satellite, $X^{(k)}$ denotes a position of the k-th satellite, $X_0$ denotes a guess position, $b_0$ denotes a guess clock bias, and K is a positive integer.

12. The positioning system of claim 11, wherein the position of the target is calculated at least in part based on a relationship between the position of the target, the guess position, and a difference between the position of the target and the guess position.

13. The positioning system of claim 11, wherein the pseudo range values of the plurality of satellites are represented as $\rho^{(k)}=\|X^{(k)}-X\|_2+b+\tilde{\varepsilon}_\rho^{(k)}$, where $\rho^{(k)}$ denotes a pseudo range value of the k-th satellite, and $\tilde{\varepsilon}_\rho^{(k)}$ is a range error parameter.

14. The positioning system of claim 13, wherein the range error parameter $\tilde{\varepsilon}_\rho^{(k)}$ is at least caused by a multipath effect.

15. The positioning system of claim 11, wherein the rank-based approach comprises a rank-based objective function represented as $$\|v\|_R = \sum_{i=1}^{l} a(\Re(v_i))v_i,$$

where $\|v\|_R$ denotes a rank-based norm with a residual vector v representing $\delta\rho$, $\Re(v_i)$ denotes a rank of $v_i$ among $v_1, \ldots, v_l$, $v_i$ denotes a rank of a magnitude of an i-th measured distance, and $a(\Re(v_i))$ denotes a score of the i-th measured distance.

16. The positioning system of claim 10, wherein the processing unit is further utilized to calculate the position of the target based on a non-rank-based approach.

17. The positioning system of claim 16, wherein the error effect component comprises a multipath effect component.

18. The positioning system of claim 10, wherein the error effect component comprises a multipath effect component.

* * * * *